United States Patent

Flom et al.

[11] 3,990,332
[45] Nov. 9, 1976

[54] OXYGEN ASSISTED MACHINING

[75] Inventors: Donald G. Flom, Scotia; Louis E. Hibbs, Jr., Schenectady, both of N.Y.

[73] Assignee: General Electric Company, Schenectady, N.Y.

[22] Filed: Nov. 24, 1975

[21] Appl. No.: 634,469

[52] U.S. Cl. .............................. 82/1 C; 82/DIG. 1; 90/11 C; 29/106; 408/56
[51] Int. Cl.² ........................................ B23B 1/00
[58] Field of Search ...................... 82/1 C, DIG. 1; 90/11 C; 29/106; 408/56

[56] References Cited
UNITED STATES PATENTS

| | | | |
|---|---|---|---|
| 2,670,528 | 3/1954 | Brunberg | 90/11 C |
| 2,829,430 | 4/1958 | Toulmin | 82/1 C |
| 2,841,554 | 7/1958 | Ambrose et al. | 90/11 C |
| 3,518,917 | 7/1970 | Sluhan | 408/56 X |
| 3,561,299 | 2/1971 | Brisk et al. | 29/106 |
| 3,570,332 | 3/1971 | Beake | 82/1 C |
| 3,798,726 | 3/1974 | Dudley | 29/106 |

Primary Examiner—Leonidas Vlachos
Attorney, Agent, or Firm—Jane M. Binkowski; Joseph T. Cohen; Jerome C. Squillaro

[57] ABSTRACT

A method to reduce the growth rate of localized tool wear at the depth-of-cut line by the enrichment of the cutting zone atmosphere with gaseous oxygen.

10 Claims, 2 Drawing Figures

OXYGEN ASSISTED MACHINING

The invention herein described was made in the course of or under a contract or subcontract thereunder (or grant) with the Advanced Research Projects Agency.

This invention relates to the reduction or prevention of growth of the depth of cut line (DCL) notching of a cutting tool by a tough or work-hardened metal alloy workpiece.

The machining of tough alloys such as Ni- and Co-base superalloys is generally confined to three types of single point hard brittle cutting tool materials. These are (1) cemented tungsten carbides, (2) ceramic oxides and (3) cubic boron nitride compacts. The usefulness and performance of these cutting tool materials depends on their chemical and physical properties. The cemented tungsten carbide tools are relatively reactive at elevated temperatures, with diffusion between tool and workpiece constitutents occurring, as well as oxidation of the cemented carbides. The presently available ceramic oxide tools (based on $Al_2O_3$, with or without $Ti + O_2 + C$ additions) are the least reactive and most chemically stable at high temperatures of the three tool types mentioned. Cubic boron nitride compact tools are also exceptionally oxidation resistant and non-reactive, running a close second to the ceramic oxide tools in this respect.

Cubic boron nitride compact and ceramic oxide tools have very similar wear characteristics when used to machine the tough superalloys. Both types of tool materials are particularly prone to notching at the depth of cut line. The DCL notch is localized cutting tool wear greater than the uniform cutting tool flank wear, which occurs on the cutting edge where it engages with the original (not yet machined) workpiece surface. The tendency for these single point cutting tools to form a DCL notch is most prevalent when machining tough alloys such as the Ni- or Co-based superalloys or highly work-hardenable alloys such as the austenitic stainless steels. When conditions are favorable for DCL notching, i.e. as in the cutting of tough or hard metal alloys, a localized notch is initiated on the cutting edge of the tool almost simultaneously with the beginning of the cut. Specifically, a small piece of the cutting edge is fractured, and this localized chip-out or depth of cut line notch appears to be the initiating point for DCL notch propagation or growth.

In the past, DCL notching has been reduced by changing tool geometry, or by elaborate tool clamping techniques and by increasing the cutting speed. These remedies are not always practical and introduce restraints to the machining set-up which make certain cutting operations impossible. For example, an increase in the side cutting edge angle is accompanied by increased radial tool forces, which can cause workpiece deflection. On the other hand, increasing the cutting speed may reduce DCL notch growth, but can prove uneconomical if the increased temperatures result in more rapid flank wear.

It has been discovered that modifying the environment in the cutting zone by increasing its oxygen content has the effect of reducing the DCL notch propagation rate, and in some cases, essentially halting it.

Those skilled in the art will gain a further and better understanding of the present invention from the detailed description set forth below, considered in conjunction with the figures accompanying and forming a part of the specification, in which.

Figure 1:
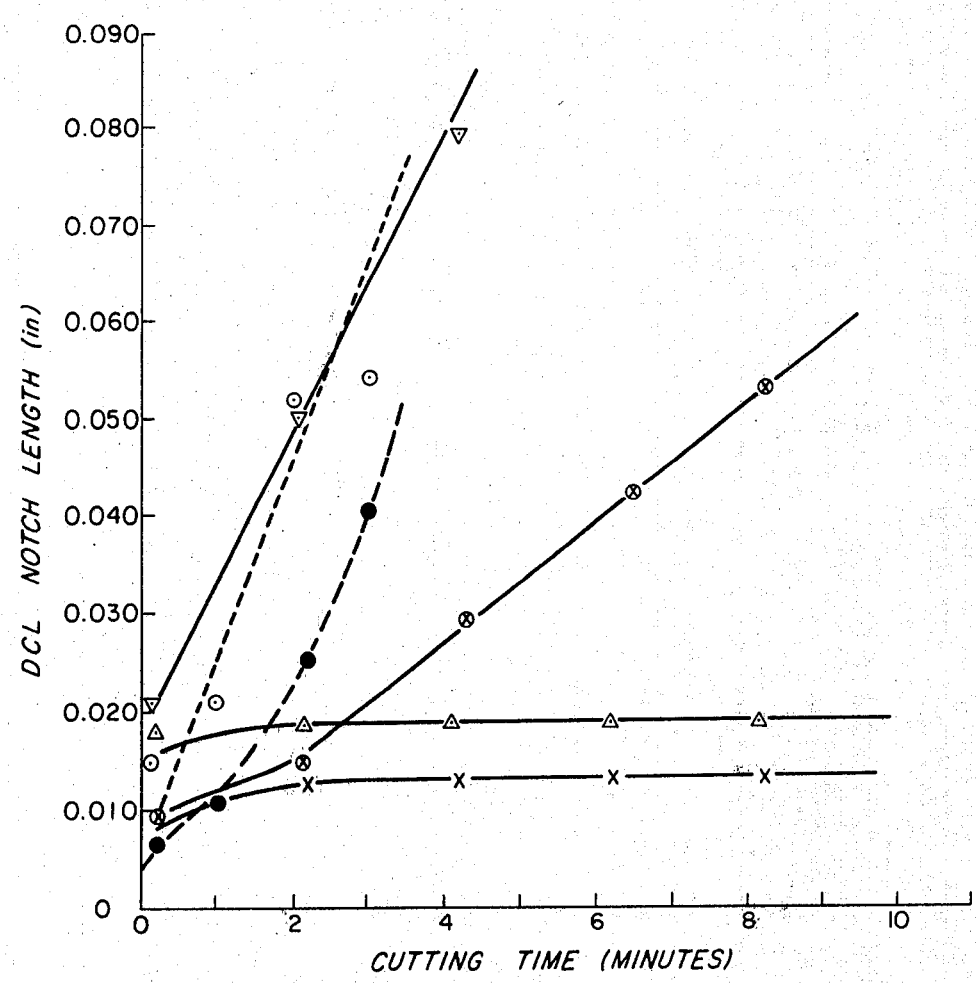
FIG. 1 is a plurality of curves showing the effect of various atmospheres on the growth of depth of cut line notching in a cubic boron nitride single point compact tool.

Briefly stated, the present process comprises filling the cutting zone atmosphere of a workpiece and a single point cutting edge tool with gaseous oxygen in an amount ranging from 50 by volume to 100% by volume of said cutting zone atmosphere, the workpiece being a metallic alloy which forms a depth of cut line notch in the cutting edge of the tool, said cutting edge being formed of a polycrystalline ceramic oxide body or a polycrystalline cubic boron nitride body, maintaining said amount of oxygen in said cutting zone atmosphere by flowing gaseous oxygen therethrough, machining said workpiece in said oxygen-containing cutting zone atmosphere with said single point cutting edge tool preventing or significantly reducing the growth of the depth of cut line notch in the cutting edge of said tool.

As a result of the present process, the growth or propagation rate of the DCL notch, is significantly or substantially reduced throughout substantially all of the cutting or machining time, it is essentially stopped after a relatively short period, usually after about one minute of cutting line. Generally, in the present process, the growth or propagation rate of the DCL notch usually progressively reduces significantly with increasing cutting time. Specifically, at the end of two minutes of cutting time, the growth rate should be at least 20 percent slower compared to the growth rate at the end of one minute of cutting time.

The major value of the present process is its simplicity and extreme flexibility. Specifically, the present invention is independent of cutting geometry, toolholder design and the machining parameters.

The cubic boron nitride compacts useful in the present process are comprised of a unified mass of cubic boron nitride crystals, which form the cutting edge, bonded to a larger metallic mass for support thereof. The larger metallic supporting mass is generally a metal bonded carbide such as tungsten carbide. Representative of these cubic boron nitride compacts are those disclosed in U.S. Pat. Nos. 3,743,489, 3,767,371 and 3,918,219.

In the present process the ceramic oxide cutting edge tool materials are densified polycrystalline aggregates of alumina with small amounts of other ceramic materials added thereto. Specifically, the ceramic oxide tool inserts or tips are produced by either sintering or hot pressing the materials to form alumina-alumina grain-boundary bonding.

The single point cutting tool of the present process can be in a number of forms. For example, the cutting tool can be in the form of a bar at one end portion of which is affixed an insert of a cutting material with a single point cutting edge. The insert is affixed mechanically or by brazing or welding. In this instance, cutting is carried out by the action of the cutting tool on the rotating workpiece. Alternatively, the cutting tool can be in the form of a rotatable cutting wheel to which one or more single point cutting edge inserts are affixed mechanically or by brazing or welding. In this instance, cutting is carried out by the action of the rotating cutting tool on the workpiece.

The workpiece in the present process is a metallic alloy which is prone to or does form a depth of cut line notch in the cutting edge of the cutting tool. Representative of such alloys are nickel- or cobalt-based superalloys. Nickel- and cobalt-based superalloys are a class of wrought, cast or hot isostatically pressed alloys which are characterized by their high strengths at the elevated temperatures which are encountered in aircraft gas turbine engines, marine gas turbine propulsion units and stationary gas turbines for power generation. Their compositions include a major amount of either nickel or cobalt, with significant amounts of alloying elements. For the nickel base superalloys these may include, by weight, cobalt (0–28.5%), chromium (8–30%), iron (0–25%), titanium (0–5%), molybdenum (0–10.5%), tungsten (0–8%), tantalum plus niobium (0–5.5%), plus small amounts of other elements such as copper, manganese, carbon, silicon, zirconium, boron, phosphorous, sulfur and magnesium. For the cobalt-base superalloys, the major alloying elements include, by weight, nickel (0–28%), chromium (19–30%), molybdenum (0–6%), tungsten (0–16%), niobium and/or tantalum (0–9%), iron (0–3%), manganese (0–2%), titanium (0–4%) and zirconium (0–2.5%). Minor alloying elements may include carbon, silicon, copper, boron and sulfur.

The nickel and cobalt superalloys are easily recognized by those skilled in the art by their trademarks. Typical trademarks include IN 100, Inconel 718, Inconel X–750, Hastelloy S, Udimet HX, Rene 41, Rene 95, S–816, and Haynes Alloy 25. An additional example of the present metallic alloy workpiece is a work-hardenable austenitic stainless steel.

In the present process, the cutting zone atmosphere is the region within which the cutting or machining of the workpiece by the cutting tool takes place. Specifically, the cutting zone atmosphere is that atmosphere in contact with and adjacent to the surfaces of the cutting edge and that of the workpiece being cut.

Initially, before the present process is begun, the cutting zone atmosphere is, ordinarily, still air at room temperature. To carry out the present process, gaseous oxygen, which initially is at room temperature, is introduced into the cutting zone atmosphere in an amount ranging from 50 by volume to 100% by volume of the cutting zone atmosphere. The gaseous oxygen is maintained in the required amount in the cutting zone atmosphere by maintaining a flow of oxygen therethrough. The proper oxygen flow is determinable empirically with larger machining operations or cutting zone atmospheres requiring more oxygen. An amount of gaseous oxygen less than 50% by volume of the cutting zone atmosphere does not produce a significant reduction in growth of the depth of cut line notching. For best results, gaseous oxygen as close as possible to 100% by volume of the cutting zone atmosphere should be used. The amount of gaseous oxygen present in the cutting zone atmosphere is determinable by standard techniques.

The present process is economical and practical since it requires only the introduction of gaseous oxygen into the cutting zone atmosphere in a certain amount and the maintenance of such gaseous oxygen during machining of the metal alloy.

The introduction and maintenance of the gaseous oxygen in the cutting zone atmosphere can be carried out by a number of techniques. For example, an open end type tube can be mounted adjacent to the cutting zone atmosphere and one end thereof connected to an oxygen tank with the opposite end positioned to introduce oxygen into the cutting zone atmosphere. Preferably, the pipe is positioned to direct a flow of oxygen at the surfaces in moving engagement. One or more such oxygen introducing pipes can be used and the particular oxygen gas flow rate as well as the number of pipes are determinable empirically. However, the gas tube should be capable of delivering a flow of at least 0.4 cubic feet per minute of oxygen gas into the cutting zone atmosphere. If desired, an enclosure surrounding the workpiece and cutting tool can be used as a means to promote the concentration of gaseous oxygen in the cutting zone atmosphere.

The invention is further illustrated by the following examples:

EXAMPLE 1

In this example machining of a rotating workpiece was carried out in various cutting zone atmospheres to determine the effect of the particular atmosphere on a single edge cutting tool. Specifically, tests were performed in flowing $O_2$, $N_2$, air and argon, as well as a control test in still air. The gas flow rate was 2 cubic feet per minute in all cases.

A series of runs were made turning an Inconel 718 workpiece with 1/2 inch square negative rake single edge Borazon cubic boron nitride compact inserts with a side cutting edge angle of 15°.

The Inconel 718 had been solution treated and aged and had a hardness of 42 on the Rockwell "C" scale. The Inconel 718 is a nickel-based superalloy having a nominal composition, by weight, of Ni 50–55%, Cr 17–21%, Cb + Ta 4.75–5.5%, Mo 2.8–3.3%, Co 1.0%, Ti 0.65–1.15%, Al 0.2–0.8%, Si 0.35%, Cu 0.3%, S 0.015%, P 0.015%, B 0.006%, Fe balance.

For each run the Borazon insert was clamped into a bar toolholder and mounted in a lathe dynamometer to measure two components of the cutting force, i.e. the feed force and the tangential force.

Three copper gas tubes, each 0.125 inch in inside diameter, were positioned to introduce and flow the particular gas into the cutting zone atmosphere. Specifically, the tubes were attached to the dynamometer body in such a manner as to introduce the desired gas into the cutting zone, across the tool flank and rake face respectively. In each instance the particular gas was maintained in the cutting zone atmosphere during machining in an amount ranging from 80 by volume to 100% by volume of the cutting zone atmosphere. Each gas was at room temperature before being introduced into the cutting zone atmosphere.

Cutting tests were performed at 600 surface feet per minute, 0.005 inch per revolution feed, and 0.050 inch depth of cut, i.e. the thickness of material removed from the workpiece in a single pass.

The effect of the gaseous environment upon the depth of cut line (DCL) notch growth rate is shown in FIG. 1, which summarizes the results. As illustrated by FIG. 1, the depth of cut line notch appears to form almost simultaneously with the beginning of the cut. In addition, the dramatic reduction in DCL notch propagation by an oxygen enriched atmosphere is clearly demonstrated, as well as the deleterious effect by argon, nitrogen and flowing air. Specifically, FIG. 1 shows that the growth of the depth cut line notching in the oxygen atmosphere levels off between 1 and 2 minutes of cutting time and essentially stops after 2 minutes of cutting time.

There was no discernable change in the measured cutting forces that could be related to the gaseous environment, nor were the uniform flank wear rates affected.

EXAMPLE 2

The Inconel 718 workpiece used in this example was the same as in Example 1.

A series of runs were made turning the Inconel 718 with ½ inch square negative rake single cutting edge inserts of Carboloy Grade 0–30 ceramic oxide and Carboloy Grade 883 cemented tungsten carbide with a side cutting edge angle of 15°. The gas application configuration in this example was the same as in Example 1 except that only gaseous oxygen was used. It was maintained in the cutting zone atmosphere during machining in an amount ranging from 80 by volume to 100% by volume of the cutting zone atmosphere. For each run an insert was clamped into a bar toolholder and mounted in a lathe dynamometer in the same manner as set forth in Example 1. The cutting performance using the oxygen at a flow of 2 cubic feet per minute was compared to that using only a soluble oil coolant (40:1 dilution with water).

The Grade 883 cemented tungsten carbide inserts were tested at 100 surface feet per minute, 0.010 inch per revolution feed, and 0.060 inch depth of cut. The Grade 0–30 ceramic oxide inserts were run at 600 surface feet per minute, 0.005 inch per revolution feed, and 0.060 inch depth of cut.

Figure 2:
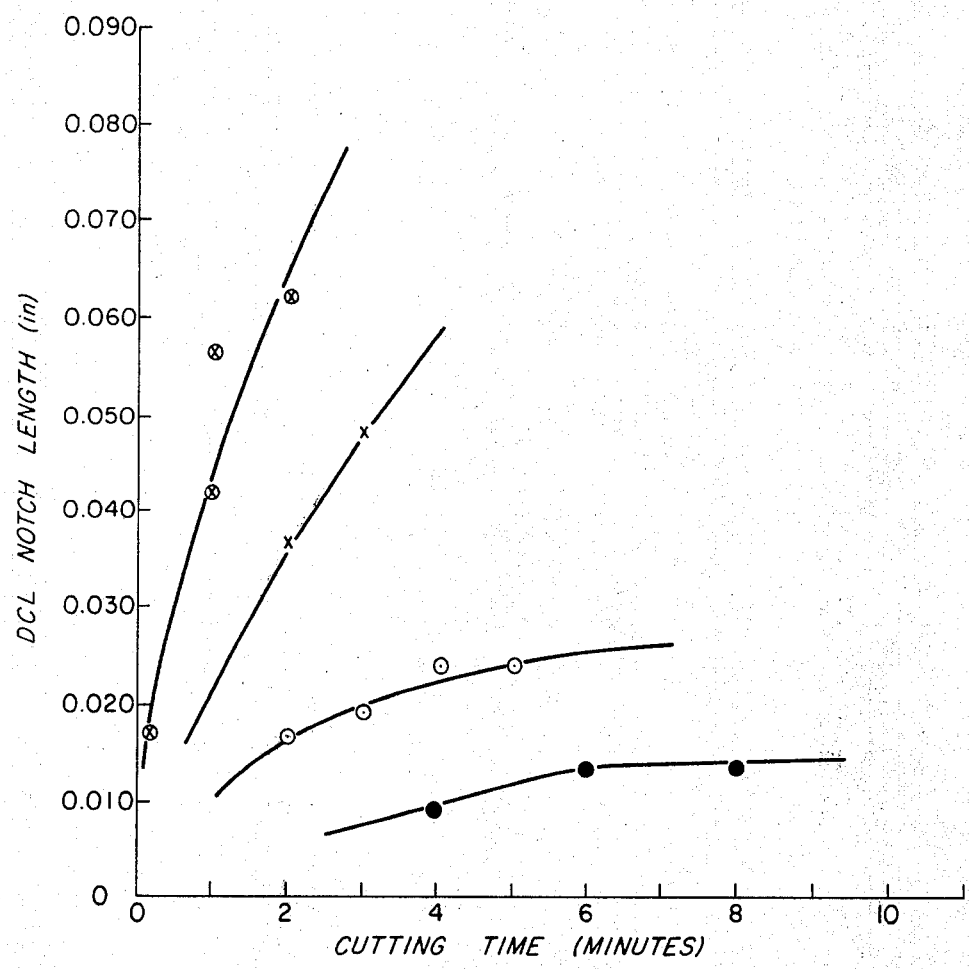
FIG. 2 is a plurality of curves showing the effect of oxygen or soluble oil on the growth of depth of cut line notching in an oxide tool and a cemented tungsten carbide tool.

The significant results of this example are summarized in FIG. 2 which shows that ceramic oxide single cutting edge tools exhibited a significant reduction in DCL notch growth rate when the oxygen enriched environment was used. The uniform flank wear rate was not significantly affected by the cutting zone atmosphere.

The cemented tungsten carbide tool inserts showed a reversal in wear characteristics when the gaseous oxygen environment was used. Both DCL notch length and uniform flank wear increased. Rake face cratering was also observed. The present process is not operable with cemented tungsten carbide inserts apparently due to the greater susceptibility to oxidation of this material.

We claim:

1. A method for reducing or preventing the growth of depth of cut line notching in a single point cutting edge tool by a workpiece which comprises filling the cutting zone atmosphere of a workpiece and a single point cutting edge tool with gaseous oxygen in an amount ranging from 50 by volume to 100% by volume of said cutting zone atmosphere, said workpiece being a metallic alloy which forms a depth of cut line notch in the cutting edge of said cutting tool, said cutting edge being formed of a polycrystalline ceramic oxide body of a polycrystalline cubic boron nitride body, maintaining said amount of oxygen in said cutting zone atmosphere by flowing gaseous oxygen therethrough, machining said workpiece in said oxygen-containing cutting zone atmosphere with said single cutting edge tool preventing or significantly reducing the growth of the depth of cut line notch in the cutting edge of said tool.

2. A method according to claim 1 wherein said cutting edge of cubic boron nitride is a portion of a cubic boron nitride compact affixed to one end portion of a bar.

3. A method according to claim 1 wherein said cutting edge of ceramic oxide is a portion of an insert affixed to one end portion of a bar.

4. A method according to claim 1 wherein said cutting edge of cubic boron nitride is a portion of an insert affixed to a rotatable cutting wheel.

5. A method according to claim 4 wherein a plurality of said inserts are affixed to said rotatable cutting wheel.

6. A method according to claim 1 wherein said cutting edge of ceramic oxide is a portion of an insert affixed to a rotatable cutting wheel.

7. A method according to claim 6 wherein a plurality of said inserts are affixed to a rotatable cutting wheel.

8. A method according to claim 1 wherein said gaseous oxygen is maintained in said cutting zone in an amount of at least 80% by volume of said cutting zone.

9. A method according to claim 1 wherein said workpiece is a metallic alloy selected from the group consisting of cobalt- or nickel-based superalloys or austenitic stainless steel.

10. A method according to claim 1 wherein said amount of gaseous oxygen is maintained in said cutting zone by a flow of gaseous oxygen at a rate of at least 0.4 cubic feet per minute from a pipe introduced into said cutting zone.

* * * * *